LARGE-POWER DISSIPATING TRANSISTOR MOUNTING

Filed Aug. 2, 1963 2 Sheets-Sheet 1

INVENTORS
STEPHEN F. MORAN
WILLIAM E. BALLARD
BY
Paul W. Griffiths
Richard P. Howard Jr.
ATTORNEYS May 4, 1965 S. F. MORAN ETAL 3,182,115

LARGE-POWER DISSIPATING TRANSISTOR MOUNTING

Filed Aug. 2, 1963

2 Sheets-Sheet 2

INVENTORS
STEPHEN F. MORAN
WILLIAM E. BALLARD

BY

ATTORNEYS

United States Patent Office 3,182,115

Patented May 4, 1965

3,182,115

LARGE-POWER DISSIPATING TRANSISTOR MOUNTING

Stephen F. Moran and William E. Ballard, San Diego, Calif., assignors to the United States of America as represented by the Secretary of the Navy Filed Aug. 2, 1963, Ser. No. 299,675
5 Claims. (Cl. 174—15)
(Granted under Title 35, U.S. Code (1952), sec. 266)

The invention described herein may be manufactured and used by or for the Government of the United States of America for governmental purposes without the payment of any royalties thereon or therefor.

The present invention relates to large-power-dissipating transistors and, more particularly, to a mounting for such transistors where the transistors are kept electrically insulated and where the heat from such transistors is drawn off and dissipated.

Previous mounting means for maintaining large-power-dissipating transistors in electrically-insulated positions generally do not satisfactorily meet the need to dissipate heat from the high-power-dissipating transistors in addition to the requirement of keeping the transistors electrically insulated. The most-commonly employed prior way of keeping these high-power-dissipating transistors electrically insulated was by the use of conventional electrical insulation (dielectric) material in the mounting intermediate the individual transistor and the mounting proper. Although this electrically-insulating material might effectuate the required electrical insulation of the high-power-dissipating transistor, it also tends to block the flow of heat away from the transistor. Where very thin electrically-insulating coatings have been employed in an effort to minimize this "heat barrier" problem, these insulating coatings are prone to breaking down due to scuffing and shipping during the mounting process. Of late, various ceramic "washers" have been developed to encircle the transistors as electrical insulators therefor and which have satisfactory thermal transfer characteristics, but these ceramic "washers" are generally affected with the disadvantages of being brittle and hard to machine. As just indicated, all of these prior methods for mounting large-power-dissipating transistors have significant drawbacks, with perhaps the most common being breakdown of the electrical insulation for these transistors or failure of the transistors due to overheating because of inadequate conduction of heat away from the transistors.

Summarized briefly, the present invention produces a mounting structure for large-power-dissipating transistors wherein the mounted transistors are satisfactorily electrically insulated while at the same time being provided with an adequate thermal conduction path by means of which the considerable heat produced by said transistors can be satisfactorily carried off and dissipated. A primary apect of the mounting structure defined herein is the use of a "hard-anodized" metal electrically-insulating member intermediate the transistor and the balance of the mounting structure from which the transistor is intended to be electrically insulated. This electrically-insulating "hard anodized" member is highly resistant to the passage therethrough of electricity, but presents a relatively low thermal resistance (i.e., has high thermal conductivity), with the result that heat is readily conducted through this "hard anodized" electrically-insulating member to a "heat sink" portion of the mounting where the heat transferred is readily dissipated. A concomitant advantage of the employment of an electrically-insulating "hard-anodized" surface (of an otherwise electrically-conductive metal member as the means for electrically insulating the transistor is the fact that this method of electrical insulation precludes the presence of that particular "heat block" which is present when any other type of electrical insulator is employed, regardless of the thermal conduction capabilities of the given electrical insulator. This "heat block" is formed because there will always be an air layer present along the interface between the given electrically-insulating member and the adjacent electrically-conductive portion of the transistor or transistor supporting structure. This "interface" air layer, which is not present between a metal surface and the anodize film placed thereon by anodizing (i.e., the anodize film being, in effect, "integrally attached" to its metal surface) is characterized by significant thermal resistance and, accordingly produces a "heat block" to materially resist the conduction of heat away from the transistor. Another advantage derived from the employment of an electrically-insulating "anodize layer" for electrically insulating the transistor from its mounting is that it permits the use of an "interference fit" at the point of electrical insulation between the transistor and its mounting, which preferably are to be maintained in as good a thermal conduction as possible with one another. An "interference fit" between two mating thermally-conductive elements improves the thermal conduction between such elements. Unlike the "hard anodize" layer electrical insulant employed here, other type insulating films or like members used as such an insulant are susceptible to being torn during "interference fitting" and, accordingly, do not practicably lend themselves to employment of an "interference fit" and the thermal conduction advantages derivative therefrom which are present here.

Another aspect of the present mounting structure is the use of a thermally-conductive, electrically-insulating liquid to replace the air space which will be normally interposed in some areas between a pair of elements which are brought into mating contact. The standard large-power-dissipating transistor dealt with here generally has a threaded base which is adapted to mate with a complementarily-threaded portion of its mounting structure. The air layer which will be present at some points intermediate these respective threaded sections (of the transistor and the mounting structure) is exemplary of the air space interposed between such mating elements. Such an air layer tends to act as a thermal insulator between the transistor and its mounting structure. By displacing such air layer by the thermally-conductive, electrically-insulating liquid, a resulting improvement is brought into the thermal conductivity capacity of the transistor mounting structure.

Among objects of importance of the present invention are:

To provide a suitable mounting for large-power-dissipating transistors wherein the transistors are electrically insulated and the heat produced by said transistors can be satisfactorily conducted away from same;

To provide an improved electrical insulator which is also a good heat conductor.

Other objects and many of the attendant advantages of this invention will be readily appreciated as the same becomes better understood by reference to the following detailed description when considered in conjunction with the accompanying drawing in which.

Figures 1, 2:
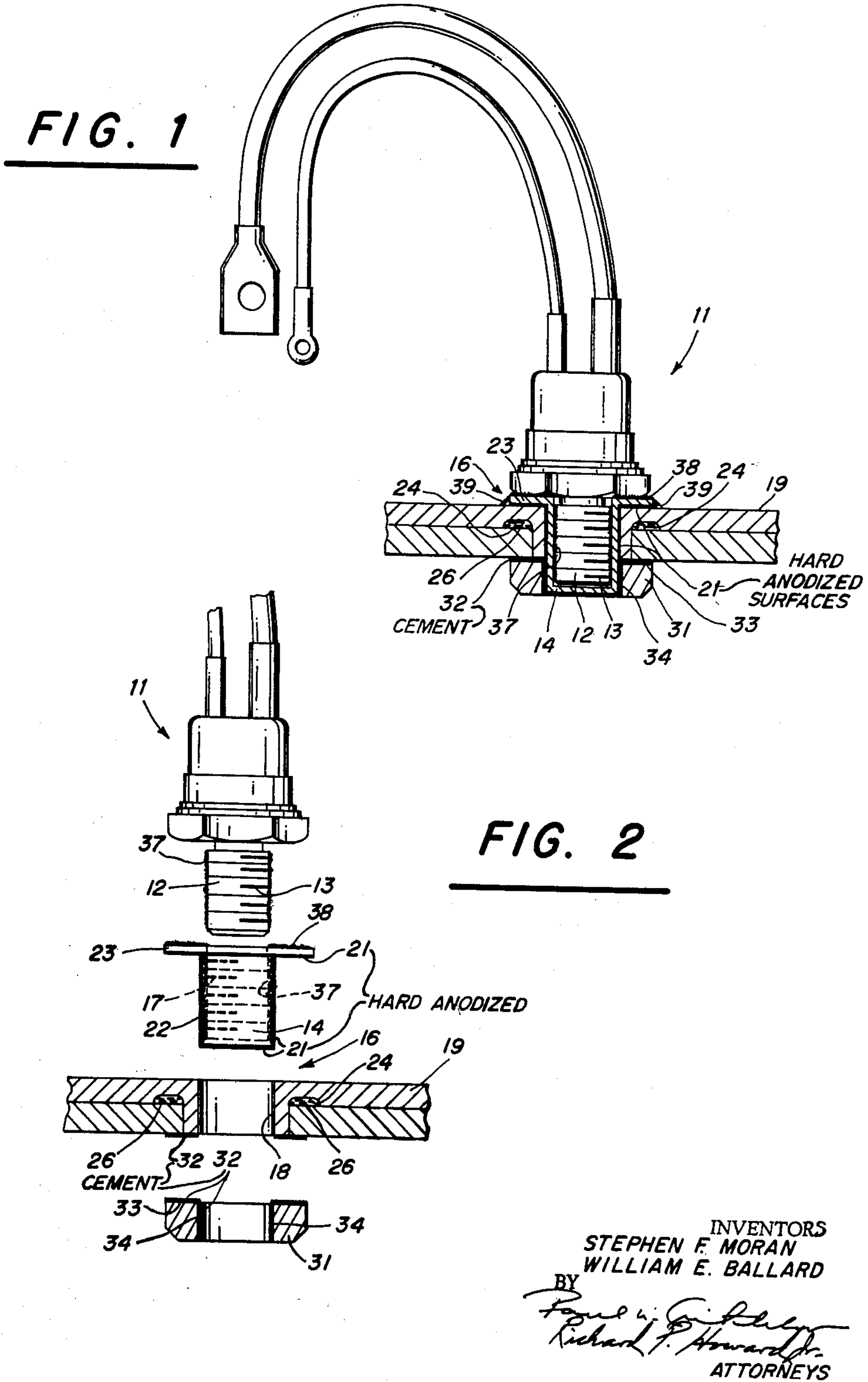
FIG. 1 shows the assembled components for one embodiment of the mounting structure with a conventional high-power-dissipating transistor mounted therein.
FIG. 2 shows the mounting structure embodiment of FIG. 1 in "exploded" view.

Looking now particularly to FIGS. 1 and 2 which display a single large-power-dissipating transistor 11 mounted in the first embodiment of the mounting structure defined herein, it is seen that this conventional transistor 11 is provided with a screw-threaded base 12 having threads 13 thereon. This threaded base 12 of large-power-dissipating transistor 11 is adapted to screw into bushing 14 of the transistor mounting 16, this bushing 14 being provided with internal threads 17 which mate with the threads 13 of transistor base 12. Bushing 14 is slightly radially oversized with respect to receptacle bore 18 formed in mounting base 19. This receptacle bore 18 is adapted to receive bushing 14, as seen in the assembled transistor mounting portrayed by FIG. 1, and, because of the relative undersize of the bore 18, bushing 14 is held firmly in the mounting base 19 by an "interference fit." Bushing 14 is "hard anodized" on its external surfaces as defined by the heavy lines 21 in FIGS. 1 and 2. The entire external surface of the longitudinally-extending portion 22 of bushing 14 is "hard anodized," as also is the underside of the flanged portion 23 of this bushing 14. With the hard anodizing present, as shown, a hard anodized surface will be located intermediate any possible contact points between the bushing 14 and the mounting base 19.

A representative protective film produced on the external surfaces of bushing 14 by the "hard anodizing" herein employed is on the order of .003 inch thick. "Hard anodizing" as generally construed in the anodizing art is considered as producing films on the order of .001 to .005 inch thick. Bushing 14 employed herein was made of aluminum with the film produced thereon by "hard anodizing" being aluminum oxide. The "hard-anodize" film produced on the indicated external surfaces of bushing 14 acts as an electrical insulant to electrically insulate transistor 11 from the mounting base 19 and structure ancillary thereto and, at the same time, permits easy flow of heat therethrough from the thermally-conductive bushing 14 to the thermally-conductive mounting base 19. Unlike other type films, the "hard anodize" film on the external surfaces of bushing 14 lends itself to the use of an "interference fit" between bushing 14 and thermally-conductive mounting base 19. Other films tend to be torn during employment in such an interference fit as employed herein making their employment for electrical insulating purposes as manifested here impracticable. This ability to use an "interference fit" between bushing 14 and mounting base 19 makes for greater thermal conductivity between these members than would be otherwise present.

Figure 4:
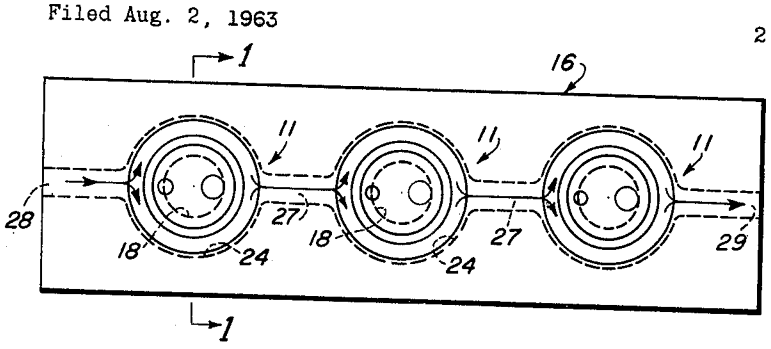
FIGS. 3 and 4 are vertical and horizontal views, respectively, showing multiple mounted transistors in a FIG. 1 type embodiment with a view of highlighting the liquid-coolant passageway.
Figure 3:
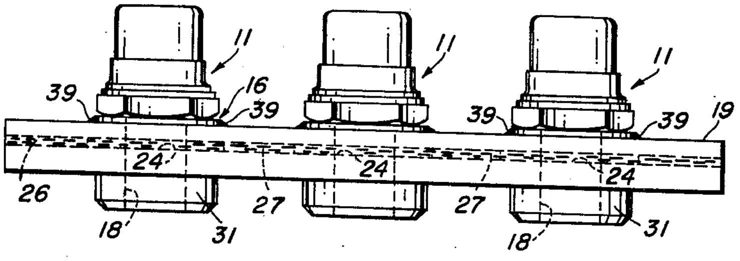

As seen perhaps best in FIGS. 3 and 4, receptacle bore 18 in the mounting base 19 is surrounded by an annular passageway 24 which is adapted to carry a fluid, generally liquid, coolant 26. The individual annular passageways 24 surrounding the respective receptacle bores 18 in mounting base 19 are interconnected in series fashion by connecting passageways 27. The first transistor in any given series of transistors accommodated by the mounting structure will have a coolant-entry passageway 28 leading into its encircling annular passageway 24 and the last transistor in the given series will have its encircling annular passageway 24 connected to a coolant-exit passageway 29. Coolant liquid 26, present in the transistor-encircling passageway 24, the various interconnecting passageways 27 and the respective entry and exit passageways 28 and 29, can be circulated throughout the transistor mounting 16, via the various passageways described, by any conventional pumping means to carry off the heat conducted to it from the various transistors 11. The heat involved will pass to coolant liquid 26 from each transistor 11 by way of bushing 14 and mounting base 19.

In assembling the various components of the transistor mounting 16, bushing 14, with the complete external surface of its longitudinally-extending portion 22 and the underside of its flanged portion 23 "hard anodized," is shrink-fitted into the bore 18 of mounting base 19 so that the undersurface of the flanged portion 23 abuts the upper surface of mounting base 19. After bushing 14 has been so positioned in the mounting base 19, a metal (thermally-conductive) collar 31, provided with any appropriate highly-electrically-resistant dielectric cement 32 on its upper surface 33 and on its radially innermost surface 34, is fitted around that portion of bushing 14 which extends below mounting base 19 and is brought into abutting contact with the undersurface of mounting base 19 which has been provided with a coating of the same aforementioned electrically-resistant cement in an annular disposition around bores 18 as indicated. The cement 32 can be, for example, any epoxy-resin type which does not absorb water. In the actual embodiment disclosed herein Eccobond 55 (Emerson & Cuming) was employed for cement 32. Through the use of this collar 31, an increased torque resistance is given to the seated bushing 14 and the liquid-coolant passageway 24 joint is sealed. Collar 31 will be generally co-extensive in longitudinal length with that portion of bushing 14 which extends below the lower surface of mounting base 19.

With bushing 14 and its encircling collar 31 in proper position, the screw threads of both bushing 14 and transistor base 12 are covered with silicone oil as seen at 37. In like fashion, the upper surface of the flanged portion 23 of bushing 14 is covered with silicone oil as seen at 38. With the silicone oil properly in place, as described, transistor base 12 is screwed into bushing 14 to seat transistor 11 in the transistor mounting 16. A conventional epoxy-resin of low water absorption characteristic (see supra) is then applied as seen at 39 (FIGS. 1 and 3) to seal the joint between the bushing 14 and the adjacent transistor structure. The silicone oil now located between the mating portions of transistor 11 and bushing 14 serves as a "thermal transfer" layer between these two members at points where they may not make metal-to-metal contact. The presence of the silicone oil eliminates the air space which would otherwise be present between the "non-contacting" points between the mating portions of the transistor 11 and bushing 14. Thus the otherwise-present air layer (between these two members) which is a poor thermal conductor is replaced by a liquid which is both a good thermal conductor and an electrical insulator. There is nothing exclusive about the use of silicone oil to form the high-conduction liquid layer which replaces the air layer. Any conventional liquid having good thermal conduction and good electrical resistance properties and which does not evaporate readily will suffice. The low-water-absorption epoxy-resin (of which there are many conventional varieties) applied at 39 acts to keep moisture (such as air-borne moisture) away from the anodized surfaces of bushing 14. Humidity and moisture tend to lower the electrical resistance of anodized surfaces which, of course, would be detrimental to the use of the "hard anodized" surfaces herein.

Looking at the assembled transistor and mounting structure therefor, it can be seen that the heat flow from transistor 11 is by metal-to-metal contact from transistor 11 to bushing 14 with the silicone oil 38 eliminating any air spaces between transistor 11 and bushing 14 and acting as a thermally-conductive path between these members where they do not make metal-to-metal contact. The heat then proceeds through the hard anodize of bushing 14 which provides electrical insulation, but offers very little resistance to heat flow due to its thinness (here on the order of .003 inch in representative thickness). After passing through the hard anodize surface of bushing 14, the heat travels through mounting base 19 to the liquid coolant 26 (in annular passageway 24) which picks up this heat and carries it off from the transistor mounting structure. The silicone oil (37 and 38) acts to improve both the heat conduction from transistor 11 via the flanged portion 23 of bushing 14 and the heat conduction from the threaded portion of the base 12 of transistor 11.

With water, or any other suitable liquid coolant, flowing through the passageways therefor in transistor mounting 16, a much higher power output can be obtained from the transistors without their "burning out."

Figure 5:
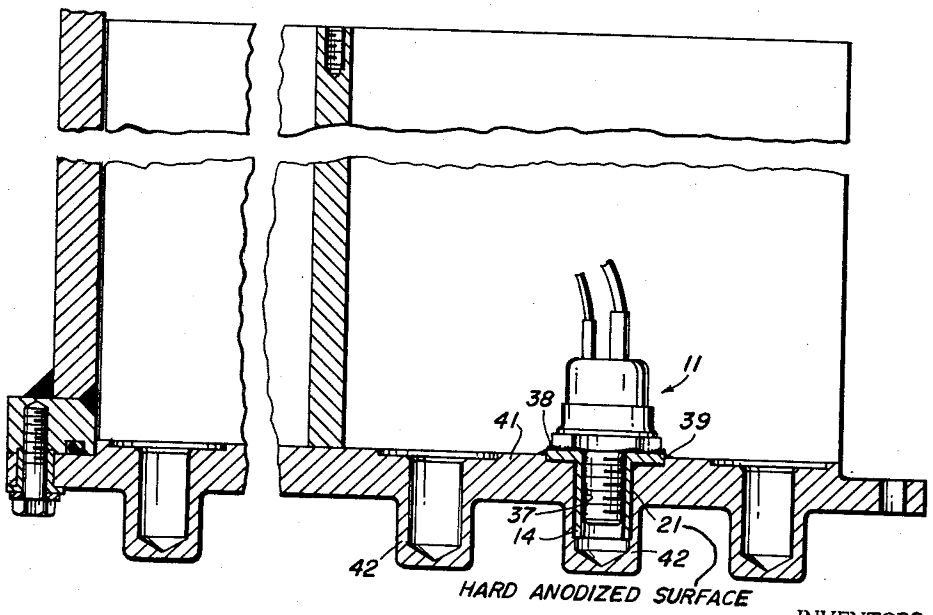
FIG. 5 portrays a second embodiment of the mounting structure of the invention.

FIG. 5 portrays a modified embodiment of the invention and is particularly applicable for use in a submarine or surface vessel where direct contact can be made between the transistor mounting structure and sea water to eliminate the need for a special coolant and the "plumbing" associated therewith. As can be seen readily from viewing FIG. 5, the mounting structure is substantially the same as the prior-described embodiment with the exception that the various passageways for accommodating the previously-employed liquid coolant 26 have been eliminated and what was previously mounting base 19 and collar 31 has been replaced by a single integral structure now designated as mounting base 41.

In this FIG. 5 embodiment, with the coolant-transporting passageways 24, 27, 28 and 29 eliminated, there is no need for collar 31 and its associated cement 32. Transistor 11 is secured in bushing 14 as described for the FIGS. 1–4 embodiment and this bushing 14 with its hard-anodized surface is seated in the mounting base 41 in a manner similar to that employed in the FIGS. 1–4 embodiment. The silicone oil as designated at 37 and 38 and cement 39 are employed as previously described herein. The only really significant difference in the operation of this FIG. 5 embodiment, as compared with the FIGS. 1–4 embodiment, is that the bosslike portions 42 and the balance of the underside of mounting base 41 are in direct contact with the external water medium (e.g.—ocean) here in the naval vessel environment, with the external water medium acting as the "heat sink" which dissipates the heat conducted to it from the individual transistors 11 via their respective hard-anodized bushings 14 and the mounting base 41.

Obviously many modifications and variations are possible in the light of the above teachings. It is intended to cover all changes and modifications of the embodiments set forth herein which do not constitute departures from the spirit and scope of the invention.

What is claimed is:

1. A transistor mounting, adapted to support large-power-dissipating transistors of the type having a threaded base, which comprises:

a thermally-conductive mounting base having a receptacle hole individual to each transistor to be supported by said transistor mounting and being formed with conduits therein which are adapted to pass a stream of forced fluid coolant through said mounting base and in proximity to each receptacle hole present in said mounting base;

a thermally-conductive metal bushing seated in each receptacle hole of said mounting base in an interference fit to prevent relative movement of said bushing with respect to its associated receptacle hole, said bushing being internally threaded to complementarily mate with the base of the transistor associated therewith and being hard-anodized on its outer surface along all points where said bushing is in thermal and possible electrical communication with said mounting base.

2. The transistor mounting of claim 1 further characterized by a layer of thermally-conductive electrically-insulating liquid intermediate said bushing and its associated transistor, when said transistor has been screwed into seated position in its bushing, for the purpose of replacing any air space present between said bushing and its associated transistor with a good thermal transfer medium.

3. The transistor mounting of claim 1 further characterized by a moisture-repellant cement in sealing position between said bushing and the associated seated transistor, said cement serving to seal off the joint between said bushing and its associated transistor so as to prevent ambient moisture from affecting the electrical resistance of the hard-anodized surface of said metal bushing.

4. A transistor mounting, adapted to support large-power-dissipating transistors of the type having a threaded base, which comprises:

a thermally-conductive mounting base having internal and external surfaces, said external surface being formed with at least one boss-like projecting portion and said internal surface having a receptacle hole extending into each of said boss-like portions, a thermally-conductive metal bushing seated in each receptacle hole of said mounting base in an interference fit to prevent relative movement of said bushing with respect to its associated receptacle hole, said bushing being internally threaded to complementarily mate with the base of the transistor associated therewith and being hard-anodized on its outer surface along all points where said bushing is in thermal and possible electrical communication with said mounting base.

5. The transistor mounting of claim 4 further characterized by a layer of thermally-conductive electrically-insulating liquid intermediate said bushing and its associated transistor, when said transistor has been screwed into seated position in its bushing, for the purpose of replacing any air space present between said bushing and its associated transistor with a good thermal transfer medium.

References Cited by the Examiner

UNITED STATES PATENTS

| | | | |
|---|---|---|---|
| 2,935,666 | 5/60 | Van Namen | 174—15 |
| 2,942,165 | 6/60 | Jackson et al. | 317—234 |
| 3,143,592 | 8/64 | August | 174—15 |

FOREIGN PATENTS

| | | |
|---|---|---|
| 659,585 | 3/63 | Canada. |

LARAMIE E. ASKIN, *Primary Examiner.*
DARRELL L. CLAY, *Examiner.*